(12) United States Patent
Ichii

(10) Patent No.: US 8,134,766 B2
(45) Date of Patent: Mar. 13, 2012

(54) OPTICAL SCANNING DEVICE AND IMAGE FORMING APPARATUS

(75) Inventor: Daisuke Ichii, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 133 days.

(21) Appl. No.: 11/853,397

(22) Filed: Sep. 11, 2007

(65) Prior Publication Data

US 2008/0068690 A1    Mar. 20, 2008

(30) Foreign Application Priority Data

Sep. 14, 2006   (JP) ................................. 2006-249165
Jun. 20, 2007   (JP) ................................. 2007-162483

(51) Int. Cl.
*G02B 26/08* (2006.01)

(52) U.S. Cl. ................. 359/210.1; 359/221.2; 359/207.6

(58) Field of Classification Search .... 359/196.1–226.3; 347/233, 256–261, 263
See application file for complete search history.

(56) References Cited

U.S. PATENT DOCUMENTS

| 5,943,153 | A  | * | 8/1999 | Naiki et al. ................. 359/210.1 |
| 6,346,957 | B1 | * | 2/2002 | Maruyama ..................... 347/115 |
| 6,381,428 | B1 | * | 4/2002 | Yamamoto et al. ........... 399/116 |
| 6,678,493 | B2 | * | 1/2004 | Maeyama et al. ............. 399/302 |
| 6,842,274 | B2 | * | 1/2005 | Akatsu et al. ............... 359/204.1 |
| 6,937,376 | B2 |   | 8/2005 | Takakubo |
| 6,987,593 | B2 |   | 1/2006 | Hayashi et al. |
| 7,218,432 | B2 |   | 5/2007 | Ichii et al. |
| 7,315,409 | B2 |   | 1/2008 | Hayashi |
| 7,414,765 | B2 |   | 8/2008 | Miyatake |
| 2003/0090563 | A1 | * | 5/2003 | Tomita et al. ................. 347/245 |
| 2005/0093968 | A1 | * | 5/2005 | Iwamoto ....................... 347/238 |

FOREIGN PATENT DOCUMENTS

| JP | 4-25810 | 1/1992 |
| JP | 2002-277783 | 9/2002 |
| JP | 3445050 | 6/2003 |
| JP | 2003-262812 | 9/2003 |
| JP | 2004-177861 | 6/2004 |
| JP | 2005-338865 | 12/2005 |
| JP | 3768734 | 2/2006 |
| JP | 2006-88569 | 4/2006 |

OTHER PUBLICATIONS

U.S. Appl. No. 12/110,862, filed Apr. 28, 2008, Ichii, et al.
U.S. Appl. No. 11/712,400, filed Mar. 1, 2007.
U.S. Appl. No. 12/190,182, filed Aug. 12, 2008, Ichii et al.
Japanese Office Action issued Apr. 27, 2011, in Patent Application No. 2007-162483.

* cited by examiner

*Primary Examiner* — Jennifer L. Doak
(74) *Attorney, Agent, or Firm* — Oblon, Spivak, McClelland, Maier & Neustadt, L.L.P.

(57) ABSTRACT

A deflecting unit deflects a plurality of light fluxes from a light source including a plurality of light emitting elements arranged in two-dimensional array. An coupling optical system between the light source and the deflecting unit includes an optical coupling element that collimates the light fluxes and a line-imaging element that images the light fluxes near the deflecting unit in a sub-scanning direction. A holding unit holds the line-imaging element in a state that a position of the line-imaging element is adjusted with respect to a direction parallel to the sub-scanning direction. A scanning optical system condenses the deflected light fluxes on the scanning surface.

11 Claims, 9 Drawing Sheets

OPTICAL SCANNING DEVICE AND IMAGE FORMING APPARATUS

CROSS-REFERENCE TO RELATED APPLICATIONS

The present application claims priority to and incorporates by reference the entire contents of Japanese priority documents, 2006-249165 filed in Japan on Sep. 14, 2006 and 2007-162483 filed in Japan on Jun. 20, 2007.

BACKGROUND OF THE INVENTION

1. Field of the Invention

The present invention relates to an optical scanning device that scans a surface with a light flux, and an image forming apparatus that includes the optical scanning device.

2. Description of the Related Art

Demand has been increasing for image forming apparatuses (e.g., a laser printer or a digital copier) that can print a high-quality image at a high speed. To satisfy such demand, methods of scanning a scanning surface to be scanned with a light flux emitted from a multi-beam light source have been developed. Along with such development, various types of optical scanning optical systems have been developed.

For example, Japanese Patent No. 3445050 discloses a multi-beam optical scanning device including a lens with two surfaces each having a curvature ratio varying gradually from an optical axis in the sub-scanning direction, thereby preventing variation in f-number in the sub-scanning direction, which corresponds to image height of a light flux incident on a scanning surface.

Japanese Patent No. 3768734 discloses an optical scanning device that includes two scanning-imaging lenses having at least two surfaces whose sub-scanning-direction curvature ratio varies from the optical axis in the main-scanning direction. At least one of two surfaces has a sub-scanning-direction curvature ratio that varies in the main-scanning direction and that has a plurality of extrema.

Japanese Patent Application Laid-open No. 2005-338865 discloses an optical scanning device that includes a scanning lens with two surfaces each having a curvature ratio varying from the optical axis in the main-scanning direction. Specifically, the surface position on the optical axis in the sub-scanning direction is closer to a scanning surface than a surface position not on the optical axis. This structure prevents variation in f-number in the sub-scanning direction, which corresponds to an image height of a light flux incident on the scanning surface.

In the optical scanning devices disclosed in Japanese Patent No. 3445050, Japanese Patent No. 3768734, and Japanese Patent Application Laid-open No. 2005-338865, however, the increase in the number of light fluxes may increase variation in beam pitch in the sub-scanning direction. This may disadvantageously inhibit forming a high quality image at a high speed.

SUMMARY OF THE INVENTION

It is an object of the present invention to at least partially solve the problems in the conventional technology.

An optical scanning device according to one aspect of the present invention scans a scanning surface using a light flux. The optical scanning device includes a light source including a plurality of light emitting elements arranged in two-dimensional array; a deflecting unit that deflects a plurality of light fluxes emitted from the light source; an coupling optical system that is provided between the light source and the deflecting unit, which includes an optical coupling element that collimates the light fluxes emitted from the light source, and a line-imaging element that images the light fluxes through the optical coupling element near the deflecting unit in a sub-scanning direction; a holding unit that holds the line-imaging element in a state that a position of the line-imaging element is adjusted with respect to a direction parallel to the sub-scanning direction; and a scanning optical system that condenses the light fluxes deflected by the deflecting unit on the scanning surface.

An image forming apparatus according to another aspect of the present invention includes at least one image carrier on which an image is formed; an optical scanning device that scans a scanning surface using a light flux, the optical scanning device including a light source including a plurality of light emitting elements arranged in two-dimensional array, a deflecting unit that deflects a plurality of light fluxes emitted from the light source, an coupling optical system that is provided between the light source and the deflecting unit, which includes an optical coupling element that collimates the light fluxes emitted from the light source and a line-imaging element that images the light fluxes through the optical coupling element near the deflecting unit in a sub-scanning direction, a holding unit that holds the line-imaging element in a state that a position of the line-imaging element is adjusted with respect to a direction parallel to the sub-scanning direction, and a scanning optical system that condenses the light fluxes deflected by the deflecting unit on the scanning surface; and a transfer unit that transfers the image on the image carrier onto a target medium to which the image is to be transferred.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
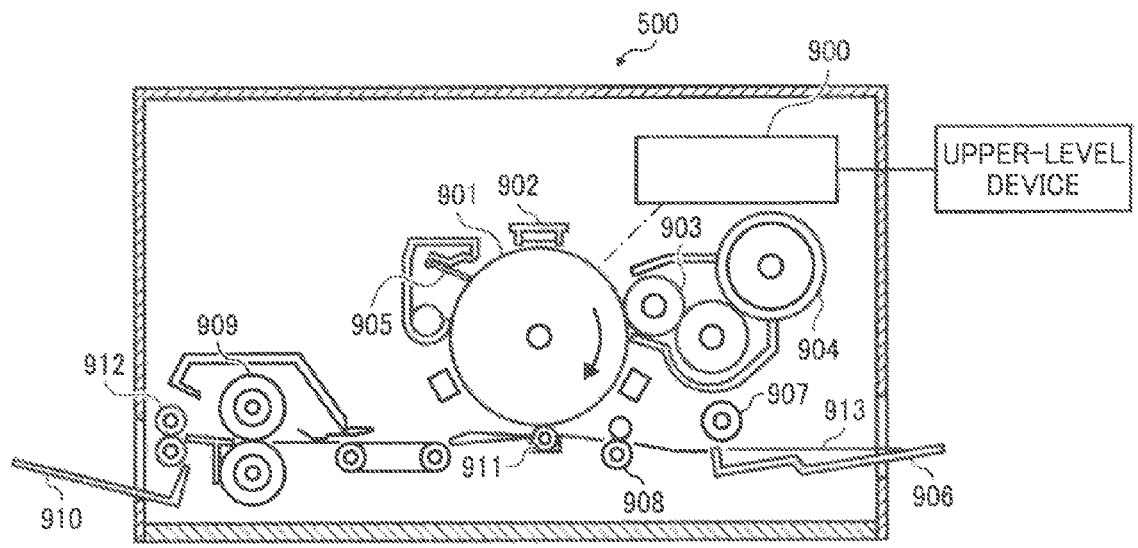
FIG. 1 is a schematic diagram of a laser printer according to an embodiment of the present invention.

FIG. 1 is a schematic diagram of a laser printer 500, which is an image forming apparatus, according to an embodiment of the present invention. The laser printer 500 includes an optical scanning device 900, a photosensitive drum 901, a charging unit 902, a developing roller 903, a toner cartridge 904, a cleaning blade 905, a sheet feeding tray 906, a sheet feeding roller 907, a pair of registration rollers 908, a charging unit 911, a fixing roller 909, a sheet discharging roller 912, and a discharged-sheet tray 910.

Near the surface of the photosensitive drum 901, the charging unit 902, the developing roller 903, the charging unit 911, and the cleaning blade 905 are positioned in this order in a direction indicated by an arrow shown in FIG. 1. The photosensitive drum 901 rotates in the direction indicated by the arrow.

The photosensitive drum 901 has a photosensitive layer that is to be scanned.

The charging unit 902 uniformly charges the surface of the photosensitive drum 901.

The optical scanning device 900 irradiates the uniformly-charged surface of the photosensitive drum 901 with a light modulated based on image information sent from an upper-level device such as a personal computer (PC). The light-irradiated area of the photosensitive drum 901 loses charges, so that an electrostatic latent image is formed on the surface based on the image information. The electrostatic latent image moves toward the developing roller 903 along with the rotation of the photosensitive drum 901. The longitudinal direction (i.e., the direction in a rotation axis) of the photosensitive drum 901 is referred to as the "main-scanning direction", and the direction in which the photosensitive drum 901 rotates is referred to as the "sub-scanning direction".

The toner cartridge 904 stores therein toner to be supplied to the developing roller 903. The amount of the toner in the toner cartridge 904 is checked when the laser printer 500 is turned ON or after printing is completed. When the amount of the remaining toner is below a predetermined amount, a message indicating that the toner cartridge 904 should be replaced is displayed on a display unit (not shown).

Along with the rotation of the developing roller 903, the toner, which is electrically charged and supplied from the toner cartridge 904, adheres to the surface of the developing roller 903 uniformly. A voltage is applied to the surface of the developing roller 903 such that the electric field, which is caused in an electrically charged portion (a portion to which no light is applied), is different from that caused in a portion not electrically charged (a portion to which the light is applied). The toner on the surface of the developing roller 903 is transferred to only the electrically-charged portion. In other words, the toner on the surface of the developing roller 903 adheres to the electrostatic latent image formed on the surface of the developing roller 903, so that the electrostatic latent image is visualized and a toner image is obtained. The toner image is conveyed toward the charging unit 911 along with the rotation of the photosensitive drum 901.

Recording sheets 913, to each of which a toner image is to be transferred, are stored in the sheet feeding tray 906. Near the sheet feeding tray 906, the sheet feeding roller 907 is positioned. The sheet feeding roller 907 feeds the recording sheets 913 from the sheet feeding tray 906 one by one. The recording sheet 913 is conveyed to the registration rollers 908 positioned near the charging unit 911, and the registration rollers 908 temporarily hold the recording sheet 913. Thereafter, in synchronization with the rotation of the photosensitive drum 901, the registration rollers 908 convey the recording sheet 913 toward a space between the photosensitive drum 901 and the charging unit 911.

A voltage having a polarity opposite to that of the toner on the surface of the photosensitive drum 901 is applied to the charging unit 911 to cause the toner to be electrically attracted to the recording sheet 913. The toner image on the surface of the photosensitive drum 901 is thus transferred to the recording sheet 913. The recording sheet 913 with the toner image thereon is conveyed to the fixing roller 909.

The fixing roller 909 applies heat and pressure to the recording sheet 913, so that the toner image is fixed to the recording sheet 913. The recording sheet 913 with the fixed image thereon is conveyed to the discharged-sheet tray 910 by the sheet discharging roller 912. In this manner, the recording sheets 913 are stacked on the discharged-sheet tray 910.

The cleaning blade 905 removes the residual toner on the surface of the photosensitive drum 901. The removed toner can be recycled. Thereafter, the photosensitive drum 901 rotates, and the surface without residual toner is back to the charging unit 902.

Figure 2:
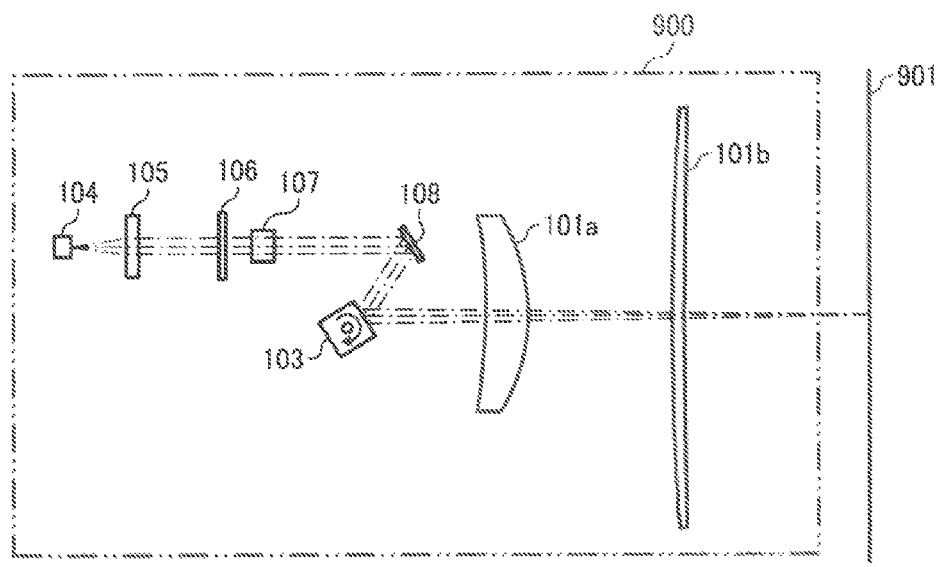
FIG. 2 is a schematic diagram of an optical scanning device shown in FIG. 1.

FIG. 2 is a schematic diagram of the optical scanning device 900. The optical scanning device 900 includes a light source 104, a coupling lens 105, an aperture 106, an anamorphic lens 107, a reflecting mirror 108, a polygon mirror 103, a polygon motor (not shown) for rotating the polygon mirror 103, a scanning lens 101a (first scanning lens), a scanning lens 101b (second scanning lens), and an intermediate member 111 shown in FIG. 5.

Figure 3:
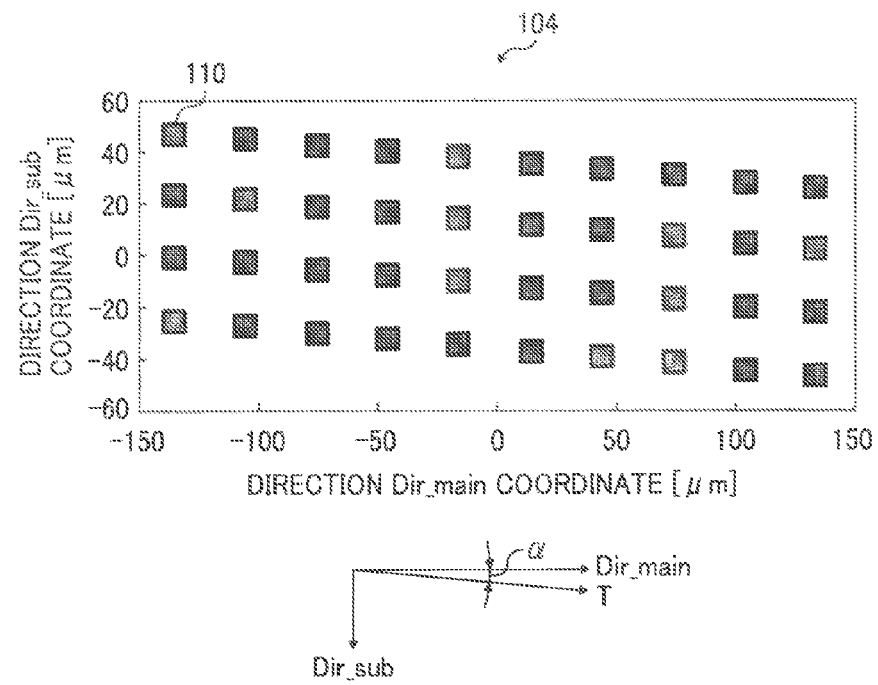
FIG. 3 is a schematic diagram of a light source shown in FIG. 2.

As shown in FIG. 3, the light source 104 includes forty of light emitters 110 arranged on a substrate. Each of the light emitters 110 is a vertical cavity surface-emitting laser (VCSEL) having an oscillation wavelength of 780 nanometers (nm). In other words, the light source 104 is a VCSEL array. In the VCSEL, the influence of the temperature on an oscillation wavelength is small, and a pseudorandom variation of the oscillation wavelength (i.e., frequency hopping) is not caused.

Figure 4:
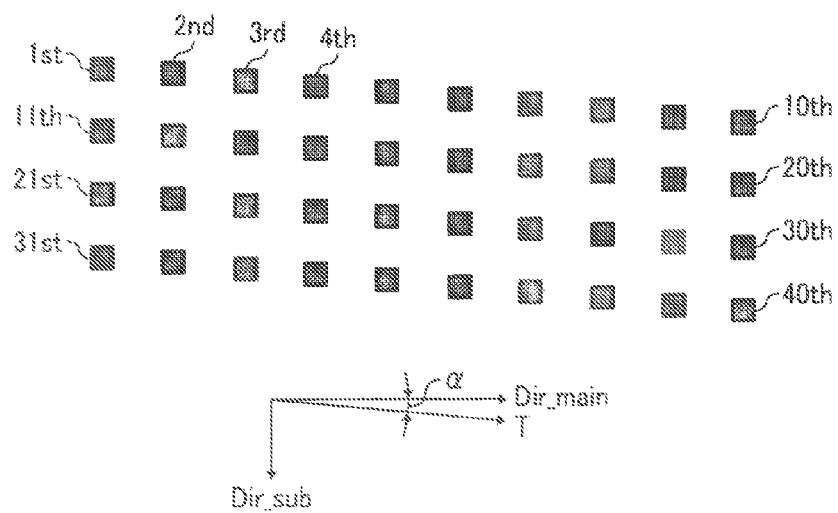
FIG. 4 is a schematic diagram of a plurality of light emitters of the light source shown in FIG. 3 for explaining numbering the light emitters.

As shown in FIG. 3, the light emitters 110 are two-dimensionally arranged in columns in a direction (hereinafter, "direction T") that forms an angle α to a main-scanning direction (i.e., "direction Dir_main"). Specifically, the light source 104 has four columns arranged in a sub-scanning direction (i.e., "direction Dir_sub"). Each of the columns has ten light emitters arranged with even intervals in the direction T. For explanation, the columns are called a "first emitter column", a "second emitter column", a "third emitter column", and a "fourth emitter column", respectively from the upper one to the lowest one shown in FIGS. 3 and 4. In addition, 10 emitters constituting the first emitter column are numbered and called "1st light emitter" to "10th light emitter" from the left to the right. Similarly, 10 emitters constituting the second emitter column are numbered and called "11th light emitter" to "20th light emitter", 10 emitters constituting the third emitter column are numbered and called "21st light emitter" to "30th light emitter" emitters, and 10 emitters constituting the fourth emitter column are numbered and called "31st light emitter" to "40th light emitter".

The coupling lens 105 shown in FIG. 2, for example, is a glass lens having a focal length of 46.6 millimeters (mm), and collimates the light fluxes emitted from the light source 104.

The aperture 106 has, for example, a rectangle opening with a front width in the main-scanning direction of 5.64 mm and a front width in the sub-scanning direction of 2.2 mm, or an oval opening. The aperture 106 adjusts the beam diameter of the light flux having passed through the coupling lens 105.

The anamorphic lens 107 is, for example, a lens made of glass and having a focal length of 104.7 mm. The light fluxes having passed through the opening of the aperture 106 are imaged near a deflecting-reflection surface of the polygon mirror 103, on which the light fluxes are deflected, via the reflecting mirror 108 in the sub-scanning direction.

Figure 5:
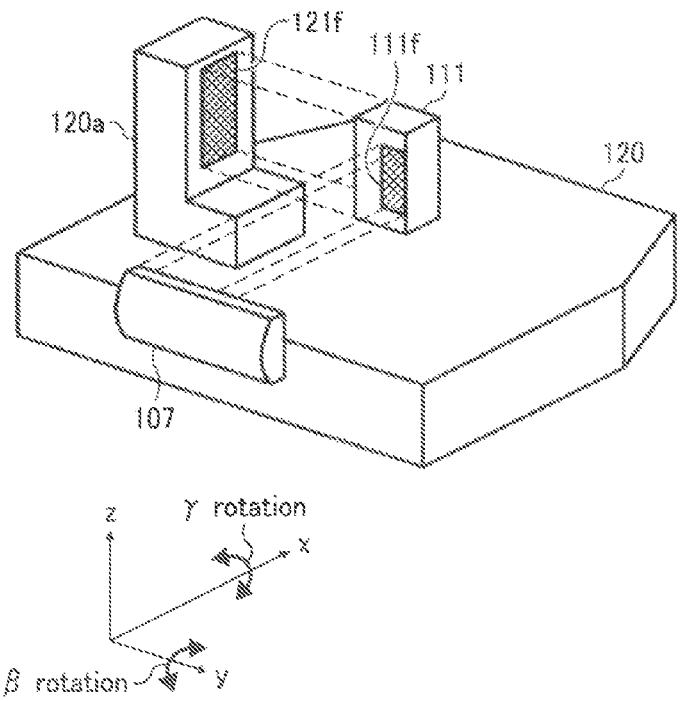
FIG. 5 is an exploded diagram of an assembly including an intermediate member.

As shown in FIG. 5, one surface of the anamorphic lens 107 is adhered to a contact surface 111$f$ of the intermediate member 111. The intermediate member 111 is adhered to a contact surface 121$f$ of a protruding member 120$a$ of a housing 120. In other words, the anamorphic lens 107 is fixed to the housing 120 via the intermediate member 111.

According to the embodiment, the contact surface 111$f$ is perpendicular to an optical-axis direction (the x-axis direction in FIG. 5), and the contact surface 121$f$ is perpendicular to the main-scanning direction (the y-axis direction in FIG. 5).

Because the surface of the anamorphic lens 107 in contact with the contact surface 111$f$ has high flatness, the anamorphic lens 107 is prevented from being obliquely attached to other members.

Accordingly, the anamorphic lens 107 can be adjusted with respect to a direction (1): the sub-scanning direction (a z-axis direction indicated by an arrow z shown in FIG. 5), a direction (2): the optical-axis direction, a direction (3): the direction corresponding to the rotation (β rotation) on a rotation axis parallel to the main-scanning direction (i.e., the x-axis direction), and a direction (4): the direction corresponding to the rotation (γ rotation) on a rotation axis parallel to the optical-axis direction.

The intermediate member 111 is made of resin that is transparent to UV light.

As described, the use of the intermediate member 111 makes it possible to adjust the anamorphic lens 107 with respect to the above directions (1) to (4), thereby inhibiting degrading of optical performance due to manufacturing error.

Figure 6:
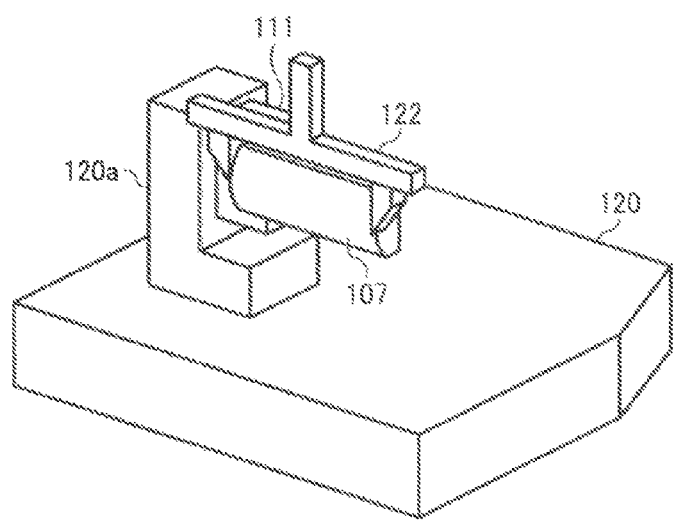
FIG. 6 is a schematic diagram of the assembly shown in FIG. 5 for explaining adjustment of an anamorphic lens.

The above adjustment is performed with, for example, a jig 122 shown in FIG. 6, while the optical characteristics of the optical scanning device 900 are monitored. The optical characteristics include a beam-waist position, a beam spot size, a beam pitch in the sub-scanning direction (hereinafter, "sub-scanning-direction beam pitch").

When the anamorphic lens 107 is adjusted with respect to the direction (1), for example, the sub-scanning-direction beam pitch is measured, i.e., a distance in the sub-scanning direction is measured between the scanning line, which corresponds to a light flux emitted from the 1st light emitter, and the scanning line, which corresponds to the light flux emitted from the 40th light emitter, on the scanning surface. Specifically, the distance (40th-1st) between beam positions of the light fluxes in the sub-scanning direction, which are emitted from the 1st light emitter and the 40th light emitter, are measured based on the image heights at the ends on the surface of the photosensitive drum 901. The anamorphic lens 107 is adjusted with respect to the sub-scanning direction such that the distance between a +side and a =side is approximately the same. In this manner, the sub-scanning-direction beam pitch can be optimized, which leads to optimized beam pitches of beam spots formed by other light fluxes.

The adjustment with respect to the direction (2) leads to optimization of beam waist positions, and the adjustment with respect to the direction (4) leads to optimization of beam spot sizes.

It is preferable that the anamorphic lens 107 be adjusted with respect to the directions (2), (4), and (1) in this order. However, the adjustment can be performed in a different order, or the adjustment with respect to the directions (2), (4), and (1) can be performed at a time. In addition, the adjustment with respect to the direction (3) can be performed if necessary.

After the adjustment, the intermediate member 111, to which an adhesive agent such as ultraviolet (UV) curable resin is applied, is fixed while being made in contact with the anamorphic lens 107 and the protruding member 120$a$. The anamorphic lens 107 has a surface parallel to the sub-scanning direction, and the surface is in contact with the intermediate member 111 (see FIG. 5). The UV curable resin is irradiated with UV light. Because the intermediate member 111 is made of a material that is transparent to the UV light, the UV-light irradiation can be performed flexibly and the anamorphic lens 107 can be fixed to the intermediate member 111 promptly and appropriately. As shown in FIG. 5, the contact surface 111$f$ of the intermediate member 111 is approximately perpendicular to the optical-axis direction of the coupling optical system (X-axis direction). The anamorphic lens 107 has a surface parallel to the contact surface 111$f$ of the intermediate member 111, and is held by the intermediate member 111 in a state where the surface is in contact with the contact surface 111$f$. In this manner, the anamorphic lens 107 can be adjusted with respect to the direction (4) easily.

When the adjustment with respect to the direction (4) is not necessary in consideration of accuracy in the shape of the members and accuracy in the assembling of the members, the surface of the intermediate member 111, which is perpendicular to the main-scanning direction (y-axis direction), can be in contact with the anamorphic lens 107. In this case, the assembly of the members can be simplified in structure and the jig can be simplified.

The above adjustment is performed during a process of installing the anamorphic lens 107 or after the process. This adjustment is characterized in that no positioning reference is required.

Figure 7A:
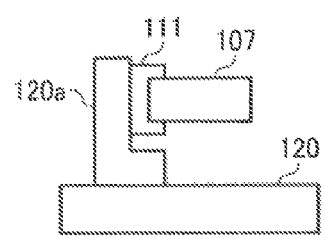
FIGS. 7A and 7B are schematic diagrams of the assembly shown in FIG. 5 for explaining influence of temperature change on the assembly according to the embodiment.
Figure 7B:
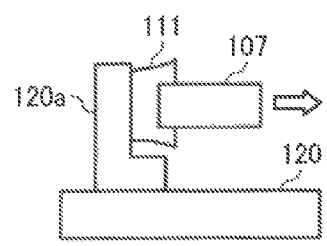

The housing 120 is made of a material different from that of the intermediate member 111, and thus, has a linear thermal expansion coefficient different from that of the intermediate member 111. Therefore, the position of the anamorphic lens 107 may be changed due to temperature change. It is preferable that the surfaces of the intermediate member 111 and the housing 120, which are in contact with each other, be flat and perpendicular to the main-scanning direction. FIGS. 7A and 7B are schematic diagrams of the assembly shown in FIG. 5 seen from the optical-axis direction. The assembly shown in FIG. 7A is in a state at an initial temperature, and the assembly shown in FIG. 7B is in a state after the temperature increases. When the linear thermal expansion coefficient of the intermediate member 111 is smaller than that of the housing 120, the surface of the intermediate member 111, to which the anamorphic lens 107 is fixed, tends to expand while the surface of the intermediate member 111, to which the protruding member 120a is fixed, is inhibited from expanding. When such expansion is caused, the intermediate member 111 deforms into a trapezoidal shape as shown in FIG. 7B. However, the anamorphic lens 107 moves only in a direction indicated by an arrow shown in FIG. 7B because the intermediate member 111 is attached to the approximate center of the intermediate member 111 with respect to the sub-scanning direction. Because the anamorphic lens 107 has no power in the main-scanning direction, the optical performance is not degraded due to the movement of the anamorphic lens 107 in the sub-scanning direction.

Figure 8A:
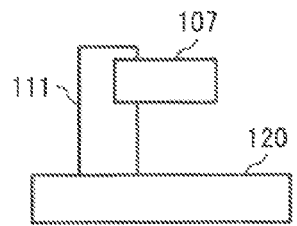
FIGS. 8A and 8B are schematic diagrams of an assembly for explaining influence of temperature change on the assembly in comparison with that represented in FIGS. 7A and 7B.
Figure 8B:
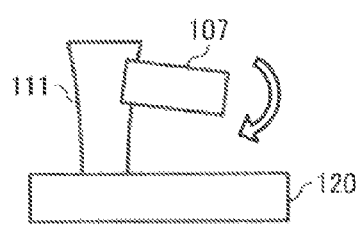

In the a case of an assembly shown in FIG. 8, a surface (the bottom portion) of the intermediate member 111 is in contact with the housing 120 at their surfaces that are parallel to the main-scanning direction. When the temperature changes, the bottom portion of the intermediate member 111 is inhibited from expanding, and the upper portion of the intermediate member 111 expands. Thus, the anamorphic lens 107 may not only move in the main-scanning direction but also rotate in a direction indicated by an arrow shown in FIG. 8B. Such rotation changes the power of the anamorphic lens 107 both in the sub-scanning direction and in the main-scanning direction. This degrades the optical performance, i.e., the beam spot size increases or the beam-spot position changes. For this reason, it is preferable that the intermediate member 111 be fixed to the housing 120 at their surfaces that are perpendicular to the main-scanning direction.

The optical system arranged on the optical path between the light source 104 and the polygon mirror 103 is called a "coupling system". In the embodiment, a coupling system includes the coupling lens 105, the aperture 106, and the anamorphic lens 107.

The polygon mirror 103 rotates on the rotation axis, which is parallel to the sub-scanning direction, at a constant speed, and has, for example, four surfaces and an inscribed circle radius of 7 mm.

Figure 9:
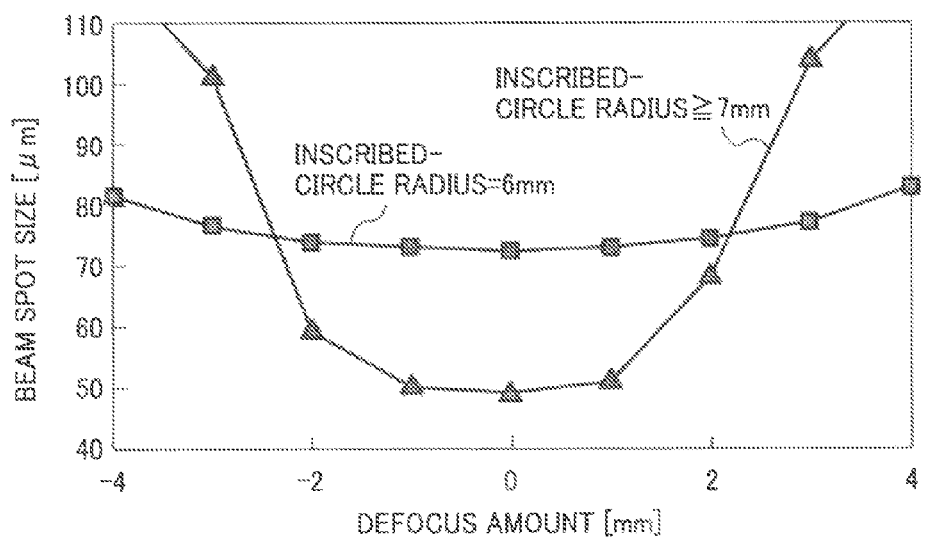
FIG. 9 is a graph representing a relationship between a beam spot size and an inscribed-circle radius.

The inscribed-circle radius of the polygon mirror 103 is preferably not less than 7 mm and not more than 10 mm. The variation in the sub-scanning-direction beam pitch is caused mainly due to the inclination of the rotation axis of the polygon mirror 103 or the inclination of deflecting-reflection surfaces of the polygon mirror 103. As to an optical scanning device with such inclination, which is caused during a process of manufacturing the optical scanning device, the influence of the inclination is small when the difference between the image heights at reflecting points is small, i.e., the inscribed-circle radius is small. Such smaller influence leads to a constant sub-scanning direction beam pitch. When the rotation axis is on the deflecting-reflection surface (i.e., the inscribed-inner radius is zero), the variation is the minimum. However, when the inscribed-circle radius is too small, the effective area of each of the deflecting-reflection surfaces of the polygon mirror 103 is also small, which decreases the light flux width in the main-scanning direction, thereby decreasing the angle of view. When a light flux width decreases, the beam spot size cannot be small and the image quality is degraded. Furthermore, a longer optical path is required for the narrow angle of view, which increases the size of the optical scanning device. If an additional reflecting member is required to realize a longer optical path, the cost of the optical scanning device also increases. The increase in the number of the parts increases error factors, which leads to degrading of image quality. The inscribed-circle radius can be reduced without reduction in the effective area, by reducing the number of deflecting-reflection surfaces. However, because the smaller number of deflecting mirrors decreases a scanning frequency, the number of rotations of the polygon mirror 103 needs to be increased, which increases power consumption or leads to the use of an expensive polygon mirror. To avoid such inconveniences, the polygon mirror 103 needs to have an inscribed-circle radius of at least 7 mm. FIG. 9 is a graph of a relationship between a beam spot size and the amount of defocusing, in which the optical path length is constant. Based on FIG. 9, it can be found that, when the inscribed-circle radius is 6 mm, the light flux width becomes smaller in the main-scanning direction so that the a beam spot formed on the scanning surface has a diameter of 72 micrometers (μm) or more, which is not a preferred value. On the other hand, when the inscribed-circle radius is 7 mm, a preferred light flux width can be assured. Accordingly, a small beam spot size of 55 μm can be realized, and thus, high resolution can be realized.

The scanning lens 101a is, for example, a lens made of resin and having a center thickness (thickness on the optical-axis) of 13.5 mm.

The scanning lens 101b is, for example, a lens made of resin and having a center thickness (thickness on the optical-axis) of 3.5 nm.

The scanning lens 101a and the scanning lens 101b each have an incidence surface, on which a light flux is incident, and an output surface, from which the light flux exits. The incidence surfaces and output surfaces are aspheric surfaces represented by the following Equation (1) and Equation (2), where X is a coordinate in the optical direction, Y is a coordinate in the main-scanning direction, $R_m$ is a curvature radius in the main-scanning direction when Y=0, $a_{00}, a_{01}, a_{02} \ldots$ and $b_{00}, b_{01}, b_{02} \ldots$ are coefficients of aspheric surfaces, $C_s(y)$ is a curvature in the sub-scanning direction with respect to Y, and $R_{s0}$ is a curvature radius on the optical axis in the sub-scanning direction. The equation Y=0 represents the center of the incidence surface. The optical axis refers to an axis passing through the center point in the sub-scanning direction when Y=0.

$$X = \frac{\frac{Y^2}{R_m}}{1 + \sqrt{1 + (1 + a_{00}) \cdot \left(\frac{Y}{R_m}\right)^2}} + \quad [1]$$

$$a_{01} \cdot Y + a_{02} \cdot Y^2 + a_{03} \cdot Y^3 + a_{04} \cdot Y^4 + \ldots$$

$$Cs(Y) = \frac{1}{R_{S0}} + b_{01} \cdot Y + b_{02} \cdot Y^2 + b_{03} \cdot Y^3 + \ldots \quad [2]$$

Table 1 shown below represents examples of $R_m$, $R_{so}$ and coefficients of each aspheric surface, i.e., each incidence surface and output surface.

TABLE 1

| | Scanning lens 101a | | scanning lens 101b | |
|---|---|---|---|---|
| | Incidence surface | output surface | incidence surface | output surface |
| $R_m$ | −120 | 59.279 | −10000 | 540.625 |
| $R_{so}$ | −500 | −600 | 521.92 | −40.751 |
| $a_{00}$ | 0 | 0 | 0 | 0 |
| $a_{04}$ | $8.88524 \times 10^{-7}$ | $9.22409 \times 10^{-7}$ | $3.28563 \times 10^{-7}$ | $1.27798 \times 10^{-7}$ |
| $a_{06}$ | $-2.62914 \times 10^{-10}$ | $6.77825 \times 10^{-11}$ | $-7.08542 \times 10^{-11}$ | $-4.62873 \times 10^{-11}$ |
| $a_{08}$ | $2.18464 \times 10^{-14}$ | $-4.11244 \times 10^{-14}$ | $6.26922 \times 10^{-15}$ | $4.04921 \times 10^{-15}$ |
| $a_{10}$ | $1.36766 \times 10^{-17}$ | $1.3728 \times 10^{-17}$ | $-2.73157 \times 10^{-7}$ | $-1.65975 \times 10^{-19}$ |
| $a_{12}$ | $-3.13542 \times 10^{-21}$ | $2.06956 \times 10^{-21}$ | $4.73881 \times 10^{-24}$ | $2.58548 \times 10^{-24}$ |
| $b_{01}$ | 0 | $-1.59477 \times 10^{-6}$ | $-7.57567 \times 10^{-7}$ | 0 |
| $b_{02}$ | 0 | $-4.33213 \times 10^{-6}$ | $-1.1328 \times 10^{-6}$ | $2.31146 \times 10^{-7}$ |
| $b_{03}$ | 0 | $4.98199 \times 10^{-9}$ | $2.60617 \times 10^{-10}$ | 0 |
| $b_{04}$ | 0 | $-2.85938 \times 10^{-9}$ | $7.89614 \times 10^{-11}$ | 0 |
| $b_{05}$ | 0 | $-2.67713 \times 10^{-12}$ | $-5.02709 \times 10^{-14}$ | 0 |
| $b_{06}$ | 0 | $2.87783 \times 10^{-13}$ | $1.40512 \times 10^{-14}$ | 0 |
| $b_{07}$ | 0 | $-1.91653 \times 10^{-15}$ | $4.55389 \times 10^{-18}$ | 0 |
| $b_{08}$ | 0 | $2.04238 \times 10^{-15}$ | $-2.01401 \times 10^{-18}$ | 0 |
| $b_{09}$ | 0 | $1.01413 \times 10^{-18}$ | $-1.54602 \times 10^{-22}$ | 0 |
| $b_{10}$ | 0 | $-6.7299 \times 10^{-19}$ | $7.48935 \times 10^{-23}$ | 0 |

Figure 10:
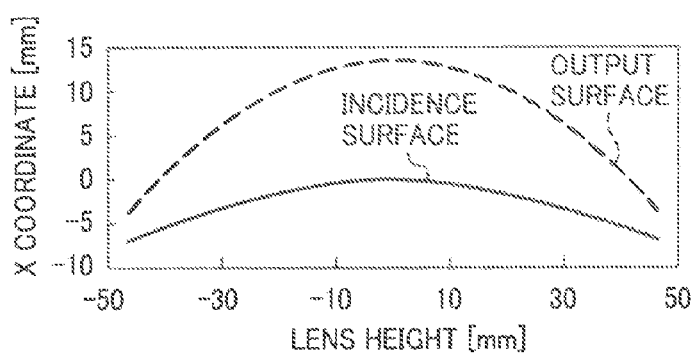
FIG. 10 is a graph for explaining a shape of a first scanning lens shown in FIG. 2.
Figure 11:
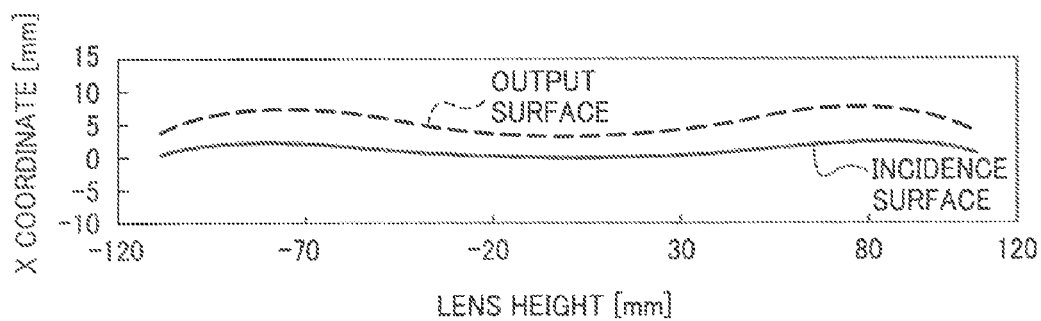
FIG. 11 is a graph for explaining a shape of a second scanning lens shown in FIG. 2.

FIG. 10 is a graph representing the shape of the scanning lens 101a, which is calculated by assigning the values shown in Table 1 to Equation (1). FIG. 11 is a graph representing the shape of the scanning lens 101b, which is calculated by assigning the values shown in Table 1 to Equation (1).

Figure 12:
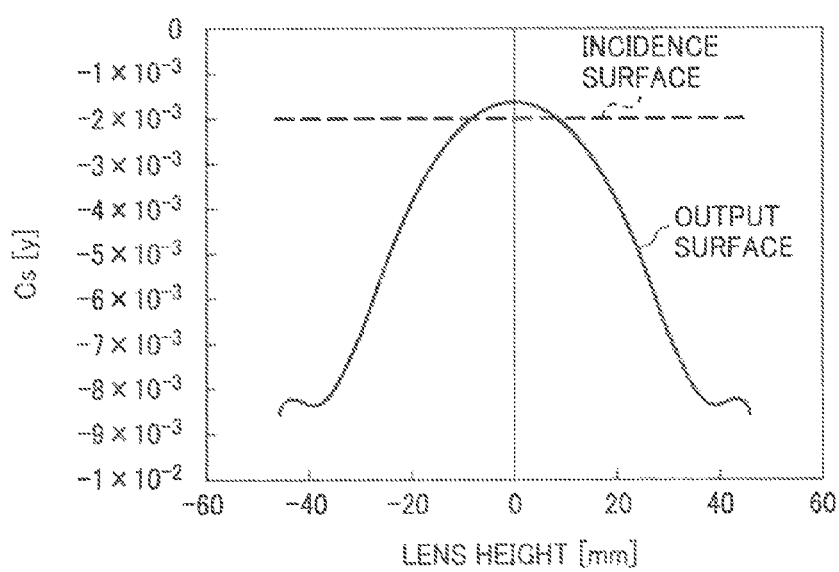
FIG. 12 is a graph for explaining curvature of the first scanning lens in the sub-scanning direction.
Figure 13:
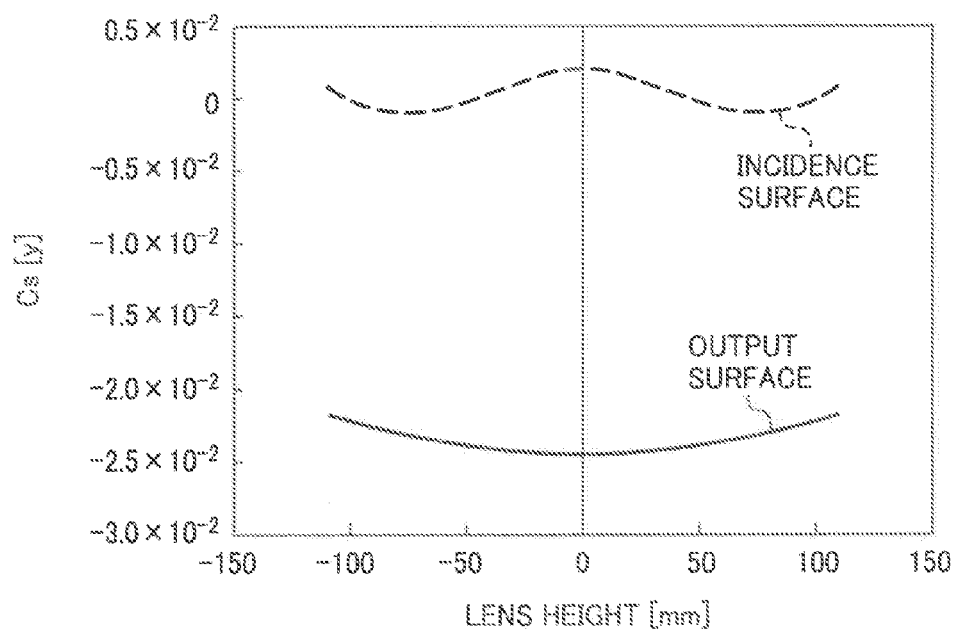
FIG. 13 is a graph for explaining curvature of the second scanning lens in the sub-scanning direction.

FIG. 12 is a graph representing Cs(Y) on the incidence surface and the output surface of the scanning lens 101a calculated by assigning the values shown in Table 1 to Equation (2). FIG. 13 is a graph representing Cs(Y) on the incidence surface and output surface of the scanning lens 101b calculated by assigning the values shown in Table 1 to Equation (2).

Based on the values shown in Table 1, a focal distance f2 in the sub-scanning direction of the scanning lens 101a and a focal distance f1 in the sub-scanning direction of the scanning lens 101b are calculated, and f1 of −6004.3 mm and f2 of 72.33 mm are obtained. This indicates that |1/f2|<|1/f1| is satisfied, i.e., the scanning lens 101b has power in the sub-scanning direction larger than that of the scanning lens 101a.

A scanning optical system arranged on the optical path between the polygon mirror 103 and the photosensitive drum 901 includes the scanning lens 101a and the scanning lens 101b.

The scanning optical system has a lateral magnification in the sub-scanning direction of 0.97, and the optical scanning device 900 has a lateral magnification in the sub-scanning direction of 2.2.

In the embodiment, a target diameter of a light spot formed on the surface of the photosensitive drum 901 is 52 μm in the main scanning direction and 55 μm in the sub-scanning direction.

For example, the distance (optical-path length) between the polygon mirror 103 and the incidence surface of the scanning lens 101a is 46.3 mm, the distance between the polygon mirror 103 and the incidence surface of the scanning lens 101b is 149.5 mm, and the distance between the polygon mirror 103 and the surface of the photosensitive drum 901 is 295.5 mm. In addition, for example, the distance between the output surface of the scanning lens 101a and the incidence surface of the scanning lens 101b is 89.7 mm, and the distance between the output surface of the scanning lens 101b and the surface of the photosensitive drum 901 is 142.5 mm.

The length of the effective scanning area on the surface of the photosensitive drum 901 (the width in the main-scanning direction in which writing is performed) is 323 mm.

Figure 14A:
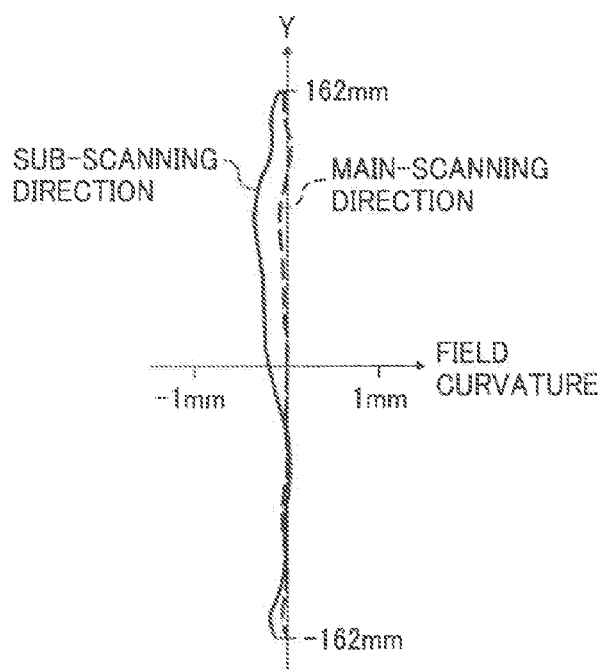
FIG. 14A is a graph for explaining a field curvature.
Figure 14B:
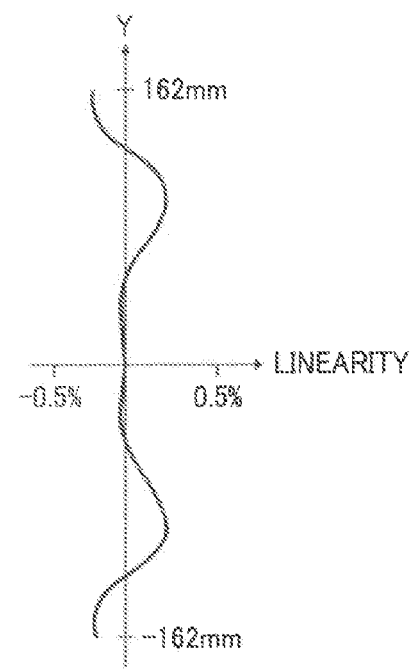
FIG. 14B is a graph for explaining linearity in the sub-scanning direction.

FIG. 14A is a graph of a result of measuring a field curvature. FIG. 14B is a graph of an example of measured linearity. FIGS. 14A and 14B represent that the image plane in the sub-scanning direction is preferable according to the embodiment, and that the variation in the beam spot size is very small although the scanning lens is thinner than a conventional one.

Figure 15:
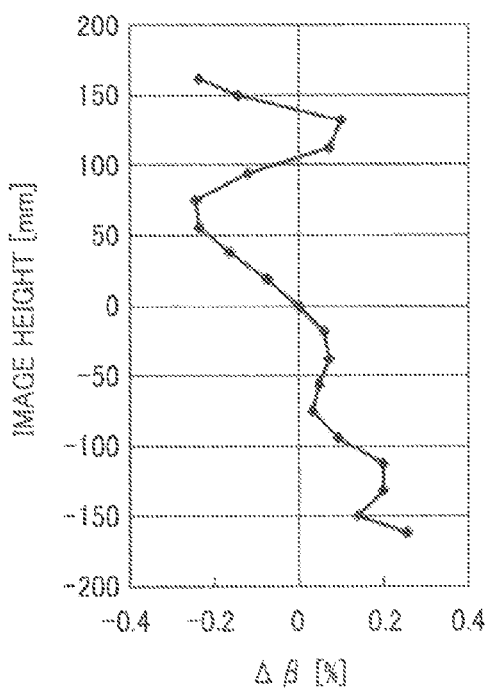
FIG. 15 is a graph for explaining deviation of lateral magnification in the sub-scanning direction.

FIG. 15 is a graph for explaining a deviation Δβ of a lateral magnification in the sub-scanning direction according to the embodiment. FIG. 15 represents that the difference between the maximum lateral magnification and the minimum magnification is approximately 0.5% or less, i.e., the lateral magnification is approximately the same in the sub-scanning direction. In this case, the lateral magnification in the sub-scanning direction with an image height of zero, is defined as a reference (i.e., Δβ=0).

Figure 16:
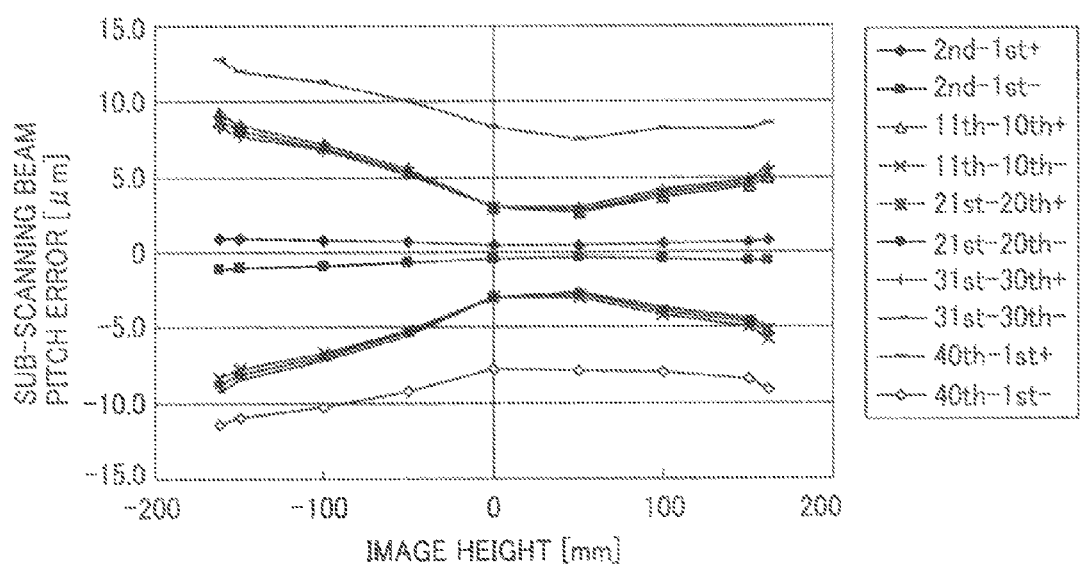
FIG. 16 is a graph for explaining variation in beam pitch in the sub-scanning direction before the anamorphic lens is adjusted.

FIG. 16 is a graph of an example of beam pitch error, which is caused before the anamorphic lens 107 is adjusted. The line 2nd-1st+ represents the beam pitch error in the + direction between the scanning line corresponding to the 1st light emitter shown in FIG. 4 and the scanning line corresponding to the 2nd light emitter. The line 2nd-1st- represents the difference in the − direction between the scanning line corresponding to the 1st light emitter and the scanning line corresponding to the 2nd light emitter shown in FIG. 4. FIG. 16 represents that the sub-scanning beam pitch error is within about 13 μm. The beam pitch error of about 13 μm may degrades image quality because the distance between scanning lines is within 11 μm upon writing with high density of 2,400 dots per inch (dpi).

Figure 17:
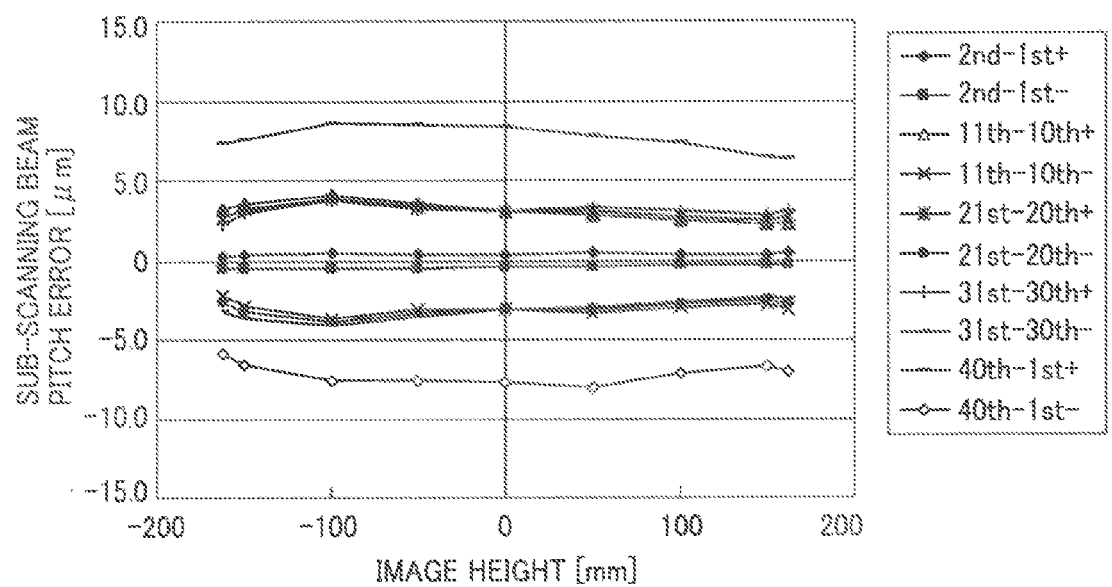
FIG. 17 is a graph for explaining variation in beam pitch in the sub-scanning direction after the anamorphic lens is adjusted.

FIG. 17 is a graph of an example of beam pitch error, which is caused after the anamorphic lens 107 is adjusted. In this case, the sub-scanning beam pitch error is within about 8.5 μm, which leads to excellent image quality even with high density of 2,400 dpi.

A transfer unit of the laser printer 500 includes the charging unit 902, the developing roller 903, the toner cartridge 904, and the charging unit 911.

The intermediate member 111 holds the anamorphic lens 107, and the position of the anamorphic lens 107 is adjusted with respect to the sub-scanning direction. Accordingly, the beam pitch in the sub-scanning direction can be optimized, which inhibits the variation in the beam pitch.

The beam spot sizes can be adjusted by adjusting the position of the anamorphic lens 107, because the anamorphic lens 107 is held rotatably on an axis substantially parallel to the optical axis of the coupling system.

Because the scanning lens 101b has power in the sub-scanning direction larger than that of the scanning lens 101a, the difference between the maximum lateral magnification and the minimum lateral magnification can be easily reduced. This reduces both of the variation in the lateral magnification and the variation in the sub-scanning-direction beam pitch, which are caused due to temperature change.

Because the polygon mirror 103 has an inscribed-circle radius of 10 mm or less, it is possible to reduce the influence of the inclination of the rotation axis or the deflecting-reflection surface, of the polygon mirror 103 on the sub-scanning-direction beam pitch.

Because the laser printer 500 includes the optical scanning device 900 that inhibits variation in sub-scanning-direction beam pitch, the laser printer 500 can print a high quality image at a high speed.

Figure 18:
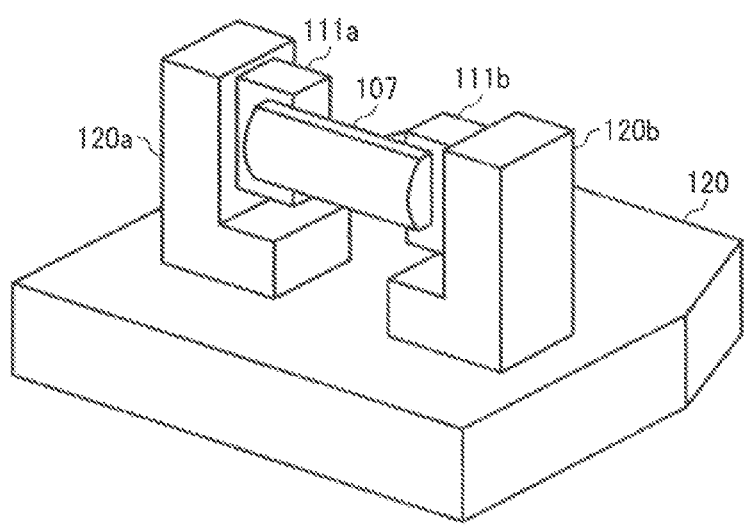
FIG. 18 is a schematic diagram for explaining a case when two intermediate members are used.

The anamorphic lens 107 is fixed to the housing 120 via the intermediate member 111. However, as shown in FIG. 18, the anamorphic lens 107 can be fixed to the housing 120 via two intermediate members 111a and 111b. In this case, the two ends of the anamorphic lens 107 are fixed to the respective intermediate members 111a and 111b. i.e., the two ends are fixed respectively to the protruding member 120a and a protruding member 120b via the intermediate members 111a and 111b. This method further reduces the change in the position of the anamorphic lens 107. Particularly, an α rotation of the anamorphic lens 107 on the sub-scanning direction can be inhibited.

In consideration of large temperature change, a diffraction grating for offsetting the influence of the temperature change can be formed on at least one surface of the scanning optical system.

In the above explanation, the coupling lens 105 and the anamorphic lens 107 are glass lenses. However, a resin lens can be alternatively used as at least any one of the coupling lens 105 and the anamorphic lens 107. A diffractive-optical element can be also used instead of the resin lens in consideration of large temperature change.

In the above explanation, the scanning optical system includes two scanning lenses. However, the scanning optical system can include three or more scanning lenses. In this case, it is preferable that $|1/f2'|<|1/f1'|$ be satisfied, where f1' is a focal length of a scanning lens, which is closest to the photosensitive drum 901, and which has power in the sub-scanning direction, and f2' is a focal length calculated based on focal lengths in the sub-scanning direction of scanning lenses other than the above scanning lens closest to the photosensitive drum 901. When $|1/f2'|<|1/f1'|$ is satisfied, the difference between the maximum lateral magnification and the minimum lateral magnification in the sub-scanning direction is small. Accordingly, both of the variation in lateral magnification and the variation in the sub-scanning-direction beam pitch that are caused due to temperature change can be reduced.

Although the laser printer 500 is explained as an image forming apparatus above, any image forming apparatus including the optical scanning device 900 can form high-quality images at a high rate.

Even when an image forming apparatus configured to form a color image is used, a high-quality color image can be obtained by using an optical scanning unit for forming a color image.

Figure 19:
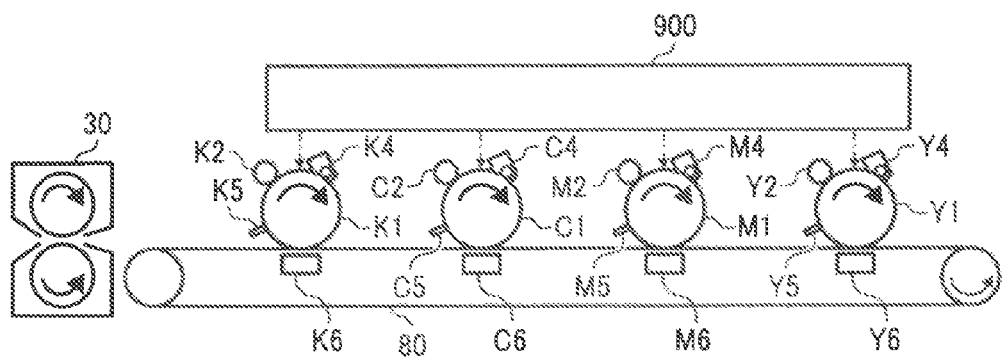
FIG. 19 is a schematic diagram of a tandem-color image forming apparatus.

For example, a tandem-color image forming apparatus shown in FIG. 19 can be employed. The tandem-color image forming apparatus includes a photosensitive drum K1, a charger K2, a developer K4, a cleaning unit K5, and a transfer charging unit K6, for black (K); a photosensitive drum C1, a charger C2, a developer C4, a cleaning unit C5, and a transfer charging unit C6, for cyan (C); a photosensitive drum M1, a charger M2, a developer M4, a cleaning unit M5, and a transfer charging unit M6, for magenta (M); a photosensitive drum Y1, a charger Y2, a developer Y4, a cleaning unit Y5, and a transfer charging unit Y6, for yellow (Y); the optical scanning device 900; a transfer belt 80; and a fixing unit 30.

The light emitters of the light source 104 are allocated for the corresponding colors (i.e., black, cyan, magenta, and yellow). A light flux emitted from a light emitter for black is applied to the surface of the photosensitive drum K1. Similarly, the light fluxes emitted from light emitters for cyan, magenta, yellow are applied respectively to the surfaces of the photosensitive drums C1, M1, and Y1.

The photosensitive drums K1, C1, M1, and Y1 rotate respectively in the directions indicated by the arrows shown in FIG. 19. Along the rotation direction, the charger, developer, the transfer charger, and the cleaning unit are positioned in this order. The chargers K2, C2, M2, and Y2 charge the respective surfaces of the photosensitive drums K1, C1, M1, and Y1. The optical scanning device 900 applies the light fluxes to the surfaces of the photosensitive drums K1, C1, M1, and Y1, and thus, electrostatic latent images are formed on the surfaces of the photosensitive drums K1, C1, M1, and Y1. The developers develop the electrostatic latent images, so that toner images are formed on the surfaces. The transfer chargers K6, C6, M6, and Y6 transfer the toner images from the surfaces of the photosensitive drums K1, C1, M1, and Y1 to a recording medium. The recording medium with an unfixed toner image thereon is conveyed to the fixing unit 30, and the fixing unit 30 fixes the unfixed toner image on the recording medium.

Figure 20:
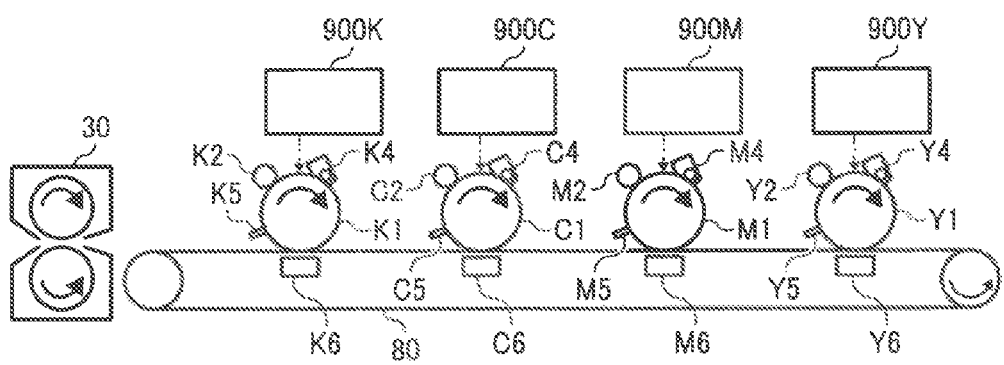
FIG. 20 is a schematic diagram of a tandem-color image forming apparatus having a configuration different from that shown in FIG. 19.

As shown in FIG. 20, the tandem-color image forming apparatus includes, instead of the optical scanning device 900, optical scanning devices 900K for black, 900C for cyan, 900M for magenta, and 900Y for yellow.

According to an aspect of the present invention, a sub-scanning-direction beam pitch can be optimized, which inhibits variation in the sub-scanning-direction beam pitch.

According to an aspect of the present invention, high-quality images can be formed at a high rate.

The above and other objects, features, advantages and technical and industrial significance of this invention will be better understood by reading the following detailed description of presently preferred embodiments of the invention, when considered in connection with the accompanying drawings.

What is claimed is:

1. An optical scanning device that scans a scanning surface using a light flux, the optical scanning device comprising:
   a light source including a plurality of light emitting elements arranged in two-dimensional array;
   a deflecting unit that deflects a plurality of light fluxes emitted from the light source;
   a coupling optical system that is provided between the light source and the deflecting unit, the coupling optical system including
      a optical coupling element that is arranged between the light source and the deflecting unit on an optical path and collimates the light fluxes emitted from the light source, and
      a line-imaging element that images the light fluxes through the optical coupling element near the deflecting unit in a sub-scanning direction;

a scanning optical system that condenses the light fluxes deflected by the deflecting unit on the scanning surface;

a housing that house the coupling optical system and on which housing the coupling optical system is fixed; and an intermediate member that is arranged between the housing and the line-imaging element, wherein surfaces of the line-imaging element and the intermediate member that are in contact with each other are flat and perpendicular to a main-scanning direction.

2. The optical scanning device according to claim 1, wherein a first surface of the line-imaging element is parallel to a second surface of the intermediate member in the sub-scanning direction, and the first surface and the second surface are in contact with each other in the state that the position of the line-imaging element is adjusted so that the line-imaging element is held by the intermediate member.

3. The optical scanning device according to claim 1, wherein the intermediate member holds the line-imaging element further in a state that the position of the line-imaging element is rotated around an axis parallel to an optical axis of the coupling optical system.

4. The optical scanning device according to claim 1, wherein the intermediate member includes two intermediate members each holding one of both ends of the line-imaging element.

5. The optical scanning device according to claim 1, wherein the intermediate member is one intermediate member that holds one end of the line-imaging element.

6. The optical scanning device according to claim 1, wherein the scanning optical system includes two scanning optical elements including a first scanning element that is closest to the scanning surface, the first scanning element having a power in the sub-scanning direction, and a second scanning element that is arranged on an optical path between the first scanning element and the deflecting unit, and $|1/f2|<|1/f1|$ is satisfied, where f1 is a focal length of the first scanning element in the sub scanning direction and f2 is a focal length of the second scanning element in the sub scanning direction.

7. The optical scanning device according to claim 1, wherein the scanning optical system includes at least two scanning optical elements including a first scanning element that is closest to the scanning surface, the first scanning element having a power in the sub-scanning direction, and at least one scanning element other than the first scanning element, and $|1/f2|<|1/f1|$ is satisfied, where f1 is a focal length of the first scanning element in the sub scanning direction and f2 is a focal length of the at least one scanning element in the sub scanning direction.

8. The optical scanning device according to claim 1, wherein a difference between a maximum lateral magnification and a minimum lateral magnification of the scanning optical system in the sub-scanning direction is equal to or less than 1% in an effective scanning area on the scanning surface.

9. The optical scanning device according to claim 1, wherein the deflecting unit is a rotating polygon mirror having a plurality of deflecting-reflection surfaces, and a radius of an inscribed circle of the deflecting-reflection surfaces is equal to or larger than 7 millimeters and equal to or smaller than 10 millimeters.

10. The optical scanning device according to claim 1, wherein the intermediate member and the housing are different in linear thermal expansion coefficient from each other.

11. An image forming apparatus comprising:

at least one image carrier on which an image is formed;

an optical scanning device that scans a scanning surface using a light flux, the optical scanning device including a light source including a plurality of light emitting elements arranged in two-dimensional array, a deflecting unit that deflects a plurality of light fluxes emitted from the light source, an coupling optical system that is provided between the light source and the deflecting unit on an optical path, the coupling optical system including an optical coupling element that collimates the light fluxes emitted from the light source and a line-imaging element that images the light fluxes through the optical coupling element near the deflecting unit in a sub-scanning direction, a scanning optical system that condenses the light fluxes deflected by the deflecting unit on the scanning surface, a housing that houses the coupling optical system and on which housing the coupling optical system is fixed, and an intermediate member that is arranged between the housing and the line-imaging element; and a transfer unit that transfers the image on the image carrier onto a target medium to which the image is to be transferred, wherein surfaces of the line-imaging element and the intermediate member that are in contact with each other are flat and perpendicular to a main-scanning direction.

* * * * *